3,217,042
PURIFICATION OF FORMALDEHYDE
Claude Thibault, Saint-Mande, France, assignor to Compagnie de Saint-Gobain, Neuilly-sur-Seine, France
No Drawing. Filed Oct. 6, 1960, Ser. No. 60,787
Claims priority, application France, June 14, 1960,
829,969
1 Claim. (Cl. 260—606)

This invention relates to the purification of formaldehyde and particularly to a process for dehydrating it. The process is preferably carried out at a temperature at which formaldehyde is a gas.

Formaldehyde, as produced by usual methods such as the pyrolysis of paraformaldehyde or of alpha polyoxymethylene contains varying amounts of impurities such as water, formic acid, methylformate, methanol, methylal, and the oxides of carbon. These impurities have an influence which varies according to their nature on the polymerization of formaldehyde, but it is water which is most objectionable because it catalyzes the polymerization and produces short chains. Furthermore, water is present in the largest quantities.

In order to reduce the water content of formaldehyde it has already been proposed to treat the formaldehyde with a dialkyl-ether of a polyethyleneglycol, but these products are hard to prepare and very dear.

It is an object of this invention to produce dry formaldehyde and particularly formaldehyde which contains less than 0.2% water. Another object is to dry formaldehyde by means of an inert liquid of high efficiency, low cost and easy manipulation.

Another object of the invention is to produce and provide a novel and useful desiccating agent.

Other objects of the invention will be in part set forth and in part apparent as the description proceeds.

The objects of the invention are accomplished generally speaking by washing formaldehyde with a compound having the formula

in which R is from the class consisting of organic ester and ether groups of which the organic radicals of the ether groups have from 1–4 C atoms, R' is an ester group of an organic carboxylic acid, and $n$ is from 2 to 15 inclusive, at a temperature between about 80° and about 120°. The process reduces the water content of gaseous formaldehyde by washing the gas with a diester of a polyethyleneglycol or with the monoester of a monoalkylether of a polyethyleneglycol at a temperature between about 80° and about 120° C. The process is particularly applicable to the dehydration of gaseous formaldehyde containing up to about 2% of water. By means of this invention it is possible to reduce the water content of gaseous formaldehyde to $\frac{1}{10}$ in a single passage through the washing liquid. If a still further reduction is required the formaldehyde may be washed with a second quantity of desiccating agent.

The polyethyleneglycols which are useful in this process have the formula

The preferred compounds are those which have aliphatic ester and ether groups. The number of carbon atoms in the aliphatic radicals of the ester groups is relatively unimportant, although a tendency to lose desiccating effect as the chain lengths increase leads to the use of the lower members, for instance to those having from 1–4 to 1–10 carbon atoms in the aliphatic radicals. The alkyl radicals of the monoethers are conveniently limited to from 1 to 4 carbon atoms in the alkyl radical of the ether group.

The success of this invention is astonishing as one would have thought that under the conditions of use the esters and ethers of this invention would hydrolyze, liberating one or two molecules of acid on the one hand, or alcohol or a diol. All of these products are in effect capable of reacting with formaldehyde to initiate short chains of polyoxymethylene and to cause losses of monomer of sufficient magnitude without reducing its water content. However, I have established that, under the conditions of dehydration according to the invention, there is no harmful hydrolysis. This is indicated by the following tests applied to different desiccating agents such as the acetate of the methyl monoether of triethyleneglycol, the diacetate of the same glycol, the acetate of the methyl monoether of polyethyleneglycol having a degree of condensation about 4.5, the acetate of the methyl monoether of polyethyleneglycol having a degree of condensation about 8, and the acetate of the ethyl monoether of diethyleneglycol.

In carrying out the tests, 2% of water was added to the desiccating agent and the mixture was heated at 100° C. for 2 hours, a very severe test because the monomeric formaldehyde entering into the apparatus of dehydration should not contain more than 2% of water and because the length of contact between the monomer and the ester, during dehydration, should not exceed several minutes. The quantity of acid liberated was measured and it was found to be the lower as the desiccating agent approached neutrality. When the ester was neutral the quantity of acid liberated was about 0.01 gram of acetic acid for about 100 grams of ester. For an ester slightly acid at the beginning the quantity of acid liberated remained at most equal to one gram for one hundred grams of ester. This showed that hydrolysis is negligible.

These esters and ethers are not in themselves new. They have been described as compounds in Beilstein and elsewhere. They are easy to prepare by classic methods using raw materials available on the market at low cost. This is particularly true of Carbitol Acetate which is diethyleneglycol monoethylether acetate which is efficient and inexpensive.

The technique by which the dehydration of formaldehyde is carried out may consist in passing the formaldehyde and the desiccating agent through the absorption tower in the same or opposite directions through inert packing. When the counter-current flow is used the relation of the flow of liquid to the flow of gas, by weight, may vary from 1 to 10. A good purification is obtained with a ratio of 5 parts of liquid to 1 part of gas. The use of several purification towers in series improves the desiccation. The temperature employed, from 80° to 120° C., limits the loss of formaldehyde in solution or by polymerization. Under optimum conditions one obtains purification with losses of formaldehyde which do not exceed 2 to 3%. In this way one eliminates formic acid and any methanol which may be contained in the formaldehyde.

The liquid desiccating and purifying agent can be purified easily by azeotropic distillation, producing a 98% yield. It can also be done with the equivalent or better yield by bubbling dry nitrogen through the liquid accompanied by moderate and sustained heating, for instance below 100° C.

The examples which follow illustrate the invention without limiting the scope of what has been said elsewhere herein.

*Example 1*

In a washing column 86 mm. in diameter and 1200 mm. high filled with 8 x 8 Raschig rings, there was passed counter-current for several hours formaldehyde containing 1.5% water which was to be purified and at the rate of 400 grams per hour and Carbitol Acetate at 2000 grams per hour. The temperatures taken at different points of the column varied from 95 to 100° C. The ester entering at the top of the column containing 0.11% water issued at the foot of the column containing 0.38% water. The formaldehyde issuing at the top of the column only contained 0.12% water.

In order to regenerate the drying agent dry nitrogen was passed through the liquid recovered at the base of the column at a temperature of 80° C. and a rate of 7500 liters for each 25 kgs. of the ester. The nitrogen was preliminarily dried over potassium and phosphoric anhydride. The product became limpid as its color became clearer and at the end of the operation contained only 0.11% water.

*Example 2*

Working under the same condition of temperature and supply and with the same desiccating agent as in Example 1, but using a column 50 mm. in diameter and 1800 mm. high filled with 6 x 6 Raschig rings the following results were obtained. The formaldehyde admitted contained 1.8% water and that discharged contained 0.2% water. The ester admitted contained 0.14% water and that discharged contained 0.49% water. The regeneration of the desiccating agent was carried out by the same dry nitrogen technique.

The advantages of the invention reside largely in the accomplishment of the objects of the invention. In the manufacture of formaldehyde polymers anhydrous formaldehyde gas is desirable and is provided by this invention at low cost.

As many apparently widely different embodiment of the present invention may be made without departing from the spirit and scope thereof, it is to be understood that the invention is not limited to the specific embodiments.

What is claimed is:

A method of desiccating formaldehyde which comprises washing formaldehyde with diethylene glycol monoethylether acetate at a temperature between about 80° and about 120° C.

References Cited by the Examiner
UNITED STATES PATENTS

| | | | |
|---|---|---|---|
| 2,645,665 | 7/53 | Walker et al. | 260—606 |
| 2,678,905 | 5/54 | Dice | 260—606 |
| 2,780,652 | 2/57 | Gander | 260—606 |

LEON ZITVER, *Primary Examiner.*

CHARLES B. PARKER, *Examiner.*